(12) United States Patent
Roark et al.

(10) Patent No.: US 12,468,618 B2
(45) Date of Patent: Nov. 11, 2025

(54) PARSING EVENT LOGS FOR INTERNET OF THINGS DEVICES

(71) Applicant: ZEBRA TECHNOLOGIES CORPORATION, Lincolnshire, IL (US)

(72) Inventors: Charles W. Roark, Frisco, TX (US); Mounika Ayila, Visakhapatnam (IN); Prateek Kulkarni, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/732,005

(22) Filed: Apr. 28, 2022

(65) Prior Publication Data

US 2023/0350780 A1 Nov. 2, 2023

(51) Int. Cl.
*G06F 11/34* (2006.01)
*G16Y 40/10* (2020.01)
*G16Y 40/20* (2020.01)

(52) U.S. Cl.
CPC .......... *G06F 11/3476* (2013.01); *G16Y 40/10* (2020.01); *G16Y 40/20* (2020.01)

(58) Field of Classification Search
None
See application file for complete search history.

(56) References Cited

U.S. PATENT DOCUMENTS

| | | | |
|---|---|---|---|
| 2015/0227445 A1* | 8/2015 | Arscott | G06F 11/3062 713/340 |
| 2018/0113916 A1* | 4/2018 | Singh | G06F 16/2465 |
| 2018/0314743 A1* | 11/2018 | Hamilton, II | G06F 16/2474 |
| 2021/0248514 A1* | 8/2021 | Cella | G06V 20/20 |
| 2021/0350134 A1* | 11/2021 | Garg | G06V 30/153 |
| 2022/0255689 A1* | 8/2022 | Wen | H04W 72/542 |

* cited by examiner

*Primary Examiner* — Esther B. Henderson

(57) ABSTRACT

In some implementations, a system may receive an event log including event data associated with a plurality of events that were performed by one or more external devices including the IoT device. Accordingly, the system may parse the event log to identify activity data, from the event data, associated with at least one activity that includes one or more events of the plurality of events. The system may further generate a case associated with the at least one activity and including information generated based on the activity data and may perform a process mining operation on the case including the activity data.

21 Claims, 10 Drawing Sheets

PARSING EVENT LOGS FOR INTERNET OF THINGS DEVICES

TECHNICAL FIELD

The present disclosure relates generally to Internet of Things (IoT) devices and, for example, to parsing event logs for IoT devices.

BACKGROUND

Process mining software may be configured to compare task data to an established process to report descriptive analytics. For example, a user may use a device (e.g., a printer) to perform a setup task (e.g., load the printer with label media and ribbon or install a battery), execute an operation (e.g., user input via a mouse or keyboard to send instructions from a computer to the printer so an image may be rendered and marked on media), or a maintenance operation (e.g., to clean or service a component of the printer, such as a printhead, or to recharge a battery for a mobile printer), among other examples. However, collecting and configuring task data to compare to the established process consumes significant processing resources. Accordingly, descriptive analytics regarding that established process potentially obscure useful observations pertaining to only the user tasks or to only the IoT device operations. Therefore, there is a need to identify operations associated with the IoT devices.

SUMMARY

Some implementations described herein relate to a method to perform a process mining operation on case data associated with an Internet of Things (IoT) device. The method may include receiving, by a device, an event log including event data associated with a plurality of events that were performed by one or more external devices including the IoT device. The method may include parsing, by the device, the event log to identify activity data, from the event data, associated with at least one operation that includes one or more events of the plurality of events. The method may include generating, by the device, case data associated with the at least one activity and including the identified activity data. The method may include performing, by the device, a process mining operation on the case data.

Some implementations described herein relate to a tangible machine-readable medium that stores a set of instructions for a device. The set of instructions, when executed by one or more processors of the device, may cause the device to receive an event log including event data associated with a plurality of events that were performed by one or more external devices including an IoT device. The set of instructions, when executed by one or more processors of the device, may cause the device to parse the event log to identify activity data, from the event data, associated with at least one operation that includes one or more events of the plurality of events. The set of instructions, when executed by one or more processors of the device, may cause the device to generate case data associated with the at least one operation and including the identified activity data. The set of instructions, when executed by one or more processors of the device, may cause the device to perform a process mining operation on the case data.

Some implementations described herein relate to a device. The device may include one or more memories and one or more processors coupled to the one or more memories. The one or more processors may be configured to receive an event log including event data associated with a plurality of events that were performed by one or more external devices including an IoT device. The one or more processors may be configured to parse the event log to identify activity data, from the event data, associated with at least one operation that includes one or more events of the plurality of events. The one or more processors may be configured to generate a case associated with the at least one operation and including the identified activity data. The one or more processors may be configured to perform a process mining operation on the case data.

DETAILED DESCRIPTION

Figure 1:
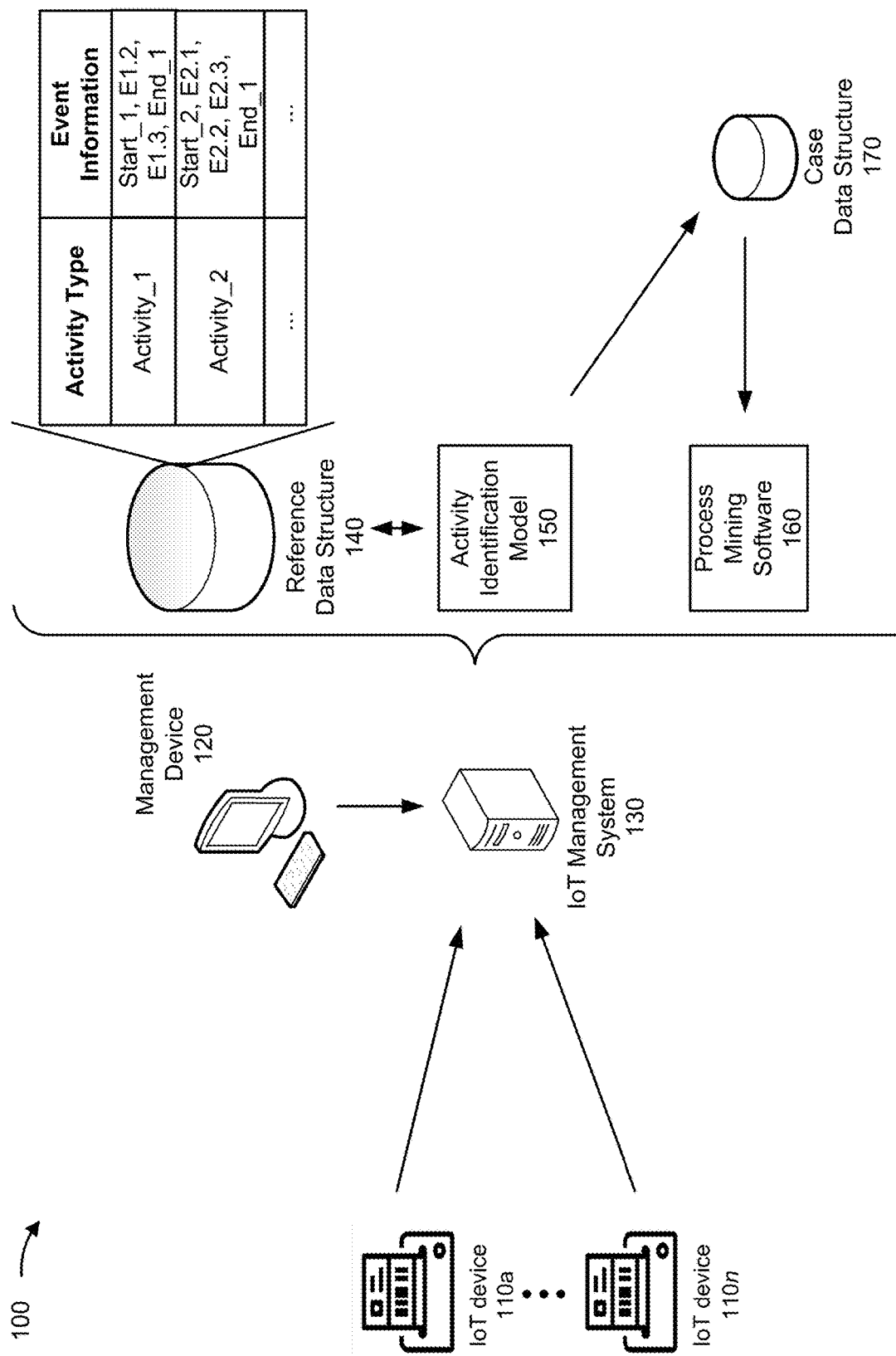
FIG. 1 is a diagram of an example implementation described herein.

An Internet of Things (IoT) device (e.g., a printer device, mobile computer device, barcode scanner, radio frequency identification (RFID) reader, scale, and the like) may be configured to perform one or more operations according to one or more instructions and/or inputs. For example, a printer device may perform a setup operation (e.g., advance a web of labels so that a first label is positioned near the printhead), a printing operation (e.g., receive print instructions, render an image, and mark the image to label media), or a maintenance operation (e.g., move a printhead to facilitate cleaning, or cease charging a battery when it is fully charged), among other examples. IoT devices may detect occurrences of operations and catalog occurrence data indicating the type of operation detected. The occurrence data may include (or be associated with) related data, such as an identifier of the device or a time of the operation, and written to a memory in an event log. However, these event logs are often organized by chronology rather than logical groupings into activities. Therefore, there is a need to identify activities associated with the IoT devices so that process mining software may be applied to report descriptive analytics associated with the operations of the IoT devices.

The following detailed description of example implementations refers to the accompanying drawings. The same reference numbers in different drawings may identify the same or similar elements.

IoT devices typically perform one or more operations when used. The particular types of operations and the order in which those operations occur may vary depending on how who is using the IoT device, what the user is trying to accomplish, or where the IoT device is being used, among other examples. Over time, performance by an IoT device may degrade or change (e.g., due to wear and tear to one or more components, due to user error, due to the IoT device being damaged, and/or due to software or firmware bugs, among other examples). On the other hand, an IoT device may improve (and/or optimize) performance (e.g., relative to the status and/or capabilities of the IoT device during use, and/or based on upgrades or changes to software and/or firmware on the IoT device, among other examples). Accordingly, process mining software may be used to help identify inefficiencies and efficiencies in operation of an IoT device to improve performance of the IoT device (e.g., conserving power, conserving processing resources, and/or conserving memory resources).

Some implementations described herein provide a system for identifying activities performed by an IoT device based on an event log associated with the IoT device. For example, as described herein, the system may receive event logs associated with a plurality of IoT devices (e.g., a plurality of IoT devices that are associated with a common site, a common user, a common brand, or with similar firmware or application software) to identify, for each IoT device, activity data that includes one or more events. In some implementations, the system may include and/or utilize a model that is configured and/or trained to identify the activity data.

Accordingly, the system may be configured to apply process mining to case data generated based on operations identified from data in the event log. Accordingly, the system may improve the performance of the IoT device by using process mining. For example, the system may cause the IoT device to adjust a configuration or setting of the IoT device to reduce a consumption of processor resources and/or memory resources (e.g., in association with performing unnecessary events and/or events in an inefficient manner) and/or to reduce (or prevent) delays in association with the IoT device performing certain tasks (which may improve a user experience, reduce power consumption, and/or increase availability to perform additional operations), among other examples. In another example, the system may transmit a notification (e.g., an alert) to a user to modify his/her behavior to improve an operation and/or performance of the IoT device.

FIG. 1 is a diagram of an example implementation 100 associated with identifying activities associated with an IoT device operation, as described herein. As shown in FIG. 1, example implementation 100 includes one or more IoT devices 110, a management device 120, and an IoT management system 130. These devices are described in more detail below in connection with FIG. 8 and FIG. 9.

In example implementation 100, the IoT management system 130 includes a reference data structure 140, an activity identification model 150, and process mining software 160. As described in connection with FIG. 8 in more detail below, the IoT management system 130 may include a communication device and/or a computing device. For example, the IoT management system 130 may include a server, such as an application server, a client server, a web server, a database server, a host server, a proxy server, a virtual server (e.g., executing on computing hardware), or a server in a cloud computing system. In some implementations, the IoT management system 130 includes computing hardware used in a cloud computing environment. As described herein, the IoT management system 130 (and/or another associated system) may configure the process mining software 160 based on a case data structure 170 including activity data extracted from event logs, as described herein.

As shown in FIG. 1, the IoT management system 130 may receive event data from a plurality of IoT devices 110 (e.g., IoT device 110a through IoT device 110n, where n represents a positive integer). In some implementations, the IoT devices 110a through 110n may all be a same type of device (e.g., all printers, all scanners, all thermostats, or all security cameras, among other examples). Alternatively, at least two of the IoT devices may be different (e.g., a thermostat and a smart light controller, a security camera and a video doorbell, and/or a printer and a nearby scanner, among other examples). Each IoT device 110 may transmit a separate event log that is combined with event logs from other IoT devices to the IoT management system 130. Additionally, or alternatively, each IoT device 110 may stream (or otherwise transmit) event data to the IoT management system 130 that is collated into an event log for the IoT devices 110a through 110n. As mentioned above, in some implementations, the IoT management system 130 may include a server in a cloud computing system or computing hardware used in a cloud computing environment. As such, in some implementations, the event data may be streamed, during performance of the IoT device 110, to the IoT management system 130 and subsequently stored. For example, the event data may be generated as the operations occur (e.g., in real-time or near real-time) and subsequently accessed via other tools and/or systems from the cloud computing system or environment.

As used herein, "event data" refers to machine-readable data associated with an operation (e.g., detected by the IoT device 110) and stored by the IoT device 110. Accordingly, an "event log" is a data structure including event data from one or more operations detected by the IoT device 110.

As further shown in FIG. 1, the IoT management system 130 may parse the event logs to identify activity data associated with at least one operation that includes one or more events performed by the IoT devices 110a through 110n. Accordingly, the IoT management system 130 may use the reference data structure 140 and the activity identification model 150 to identity the activity data, as described in connection with FIGS. 3A-3B. For example, for a maintenance activity, the IoT management system 130 may identify event data associated with individual operations that occur during the maintenance activity. For printers, the types of activities that may be detected may include maintenance activities (e.g., cleaning or replacing a printhead, replacing or adding printing media, facilitating or automatically removing/mitigating jammed printing media, charging a battery, or other types of maintenance activities), certain printing activities (e.g., involving events for printing content to media under certain conditions or with certain parameters), and certain processing activities (e.g., involving events to verify a connection with a host system or network), among other examples. For mobile computers (e.g., scanners), the types of activities that may be identified may include certain maintenance activities (e.g., updating software, clearing a memory, or other types of maintenance activities), certain scanning activities (e.g., involving events for scanning content under certain conditions or with certain parameters), and certain processing activities (e.g., involving events to verify a connection with a host system or network), among other examples. For thermostats, the types of activities that may be identified may include certain environmental control activities (e.g., heating the building, cooling the building, or other types of environmental control activities), certain maintenance activities (e.g., involving filter expiry and replacement), and certain processing activities (e.g., involving events to verify a connection with a host system or network), among other examples. Other types of activities may be similarly identified for other types of IoT devices.

As further shown in FIG. 1, the IoT management system 130 may store a data structure 170 including case data and including the identified activity data. Additionally, the case data may include derived data. For example, the IoT management system 130 may calculate durations associated with the at least one operation based on timestamps included in the activity data. Accordingly, the IoT management system 130 may process the case data using process mining software 160 (e.g., Celonis Process Mining, UiPath Platform, ARTS Process Mining 10, DISCO, Scout Platform, Minit, SAP Signavio Process Intelligence, Kofax Insight, QPR ProcessAnalyzer, or similar process mining software).

In some implementations, the IoT management system 130 may configure the IoT devices 110a through 110n based on output from the process mining operation. For example, the IoT management system 130 may configure the IoT devices 110a through 110n via communication links that are established (e.g., via a network or a peer-to-peer communication protocol) between the IoT management system 130 and the IoT devices 110a through 110n. The IoT management system 130 may configure the IoT devices 110a through 110n with settings to reduce durations associated with some activities and thereby conserve power, processing resources, and/or memory. Additionally, or alternatively, the IoT management system 130 may indicate recommended settings to a user (e.g., via a user device, as described in connection with FIG. 4). Additionally, or alternatively, the IoT management system 130 may output (e.g., to a user interface) descriptive and diagnostic analytics obtained from the process mining software 160 based on the case data (e.g., DISCO® Ediscovery data). In some implementations, the IoT management system 130 may output both the descriptive analytics based on the case data and reported process information based on task data associated with an established process including a user of the IoT devices 110a through 110n.

As indicated above, FIG. 1 is provided as an example. Other examples may differ from what is described with regard to FIG. 1. The number and arrangement of devices shown in FIG. 1 is provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
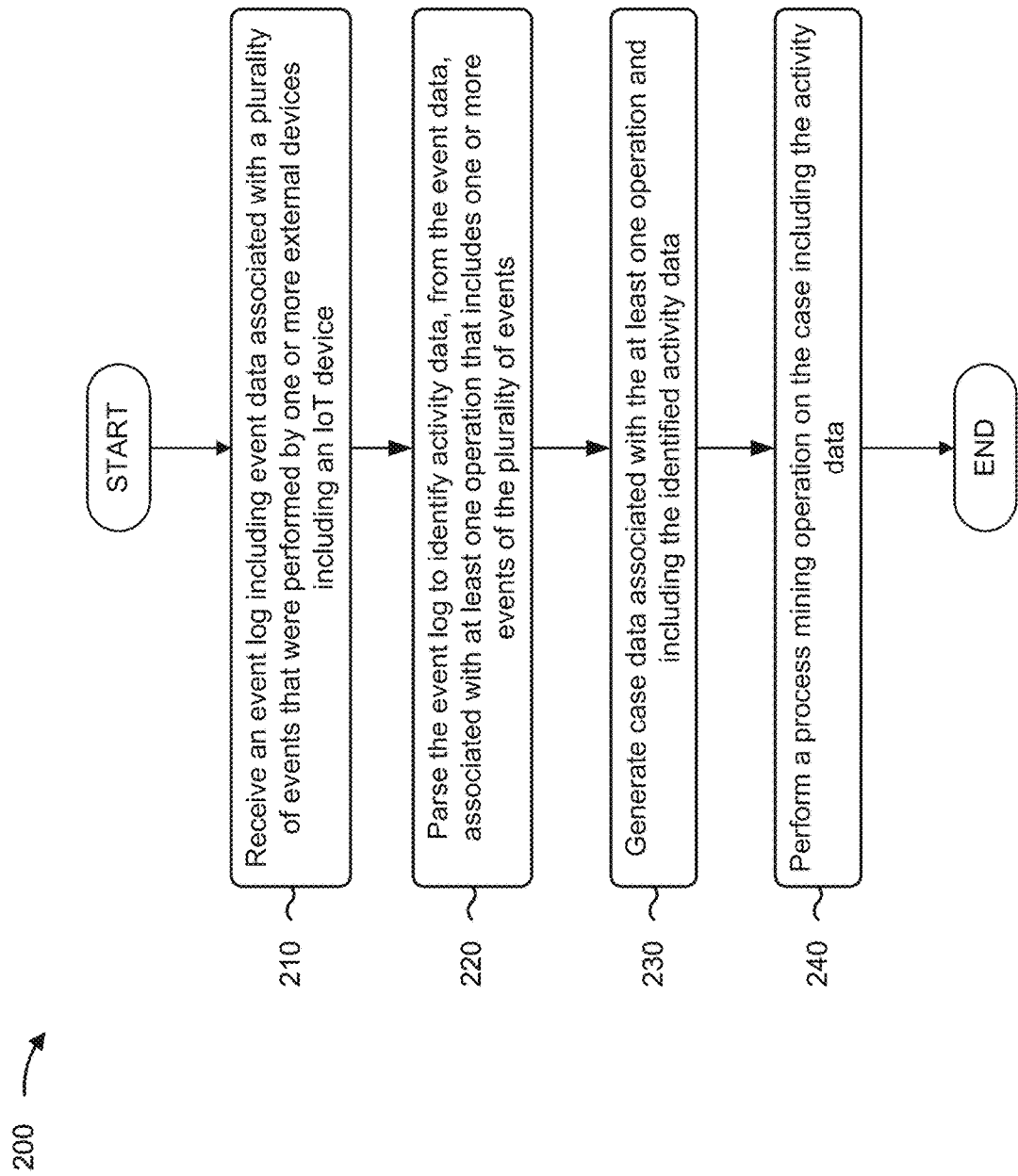
FIG. 2 is a flowchart of an example process relating to FIG. 1.
Figure 4:
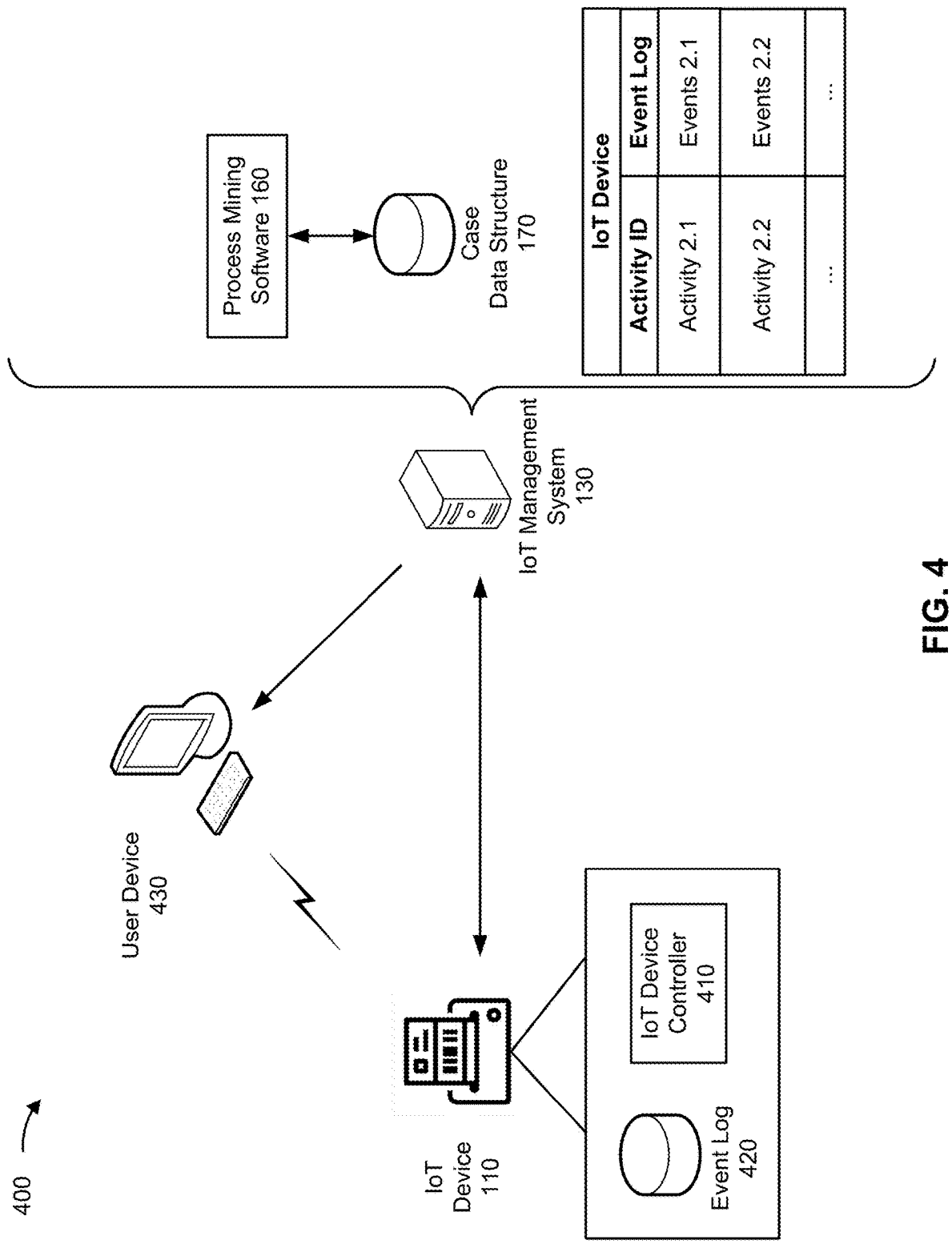
FIG. 4 is a diagram of another example implementation described herein.

FIG. 2 is a flowchart of an example process 200 associated with performing a process mining operation on case data associated with IoT devices. In some implementations, one or more process steps of FIG. 2 may be performed by a system (e.g., the IoT management system 130). In some implementations, one or more process steps of FIG. 2 may be performed by another device or a group of devices separate from or including the system, such as the IoT device 110, the management device 120, and/or a user device 430 (as shown in FIG. 4). Additionally, or alternatively, one or more process steps of FIG. 2 may be performed by one or more components of device 900 of FIG. 9, such as processor 920, memory 930, input component 940, output component 950, and/or communication component 960.

As shown in FIG. 2, in step 210, the process 200 may include receiving an event log including event data associated with a plurality of events that were performed by one or more devices (e.g., including the IoT device 110). For example, the IoT management system 130 may receive the event data from the IoT device 110. The IoT device 110 may detect an operation and catalog the occurrence of that operation in a memory. For example, a printer device may detect opening of a printhead assembly and record a printhead open occurrence type and time data in a memory of the printer as event data. In another example, the printer device may detect closing of the printhead assembly and record a printhead close occurrence type and time data in the memory of the printer as event data. Accordingly, the printer device may detect a plurality of operations and record associated event data in the memory to generate the event log. In some implementations, the IoT management system 130 may receive the event data individually from the IoT device 110 or from multiple IoT devices via event logs. The event logs may be received from the IoT device 110 during a training period that is associated with training an activity identification model and/or a feature extraction model associated with the activity identification model, as described elsewhere herein. Additionally, or alternatively, the event logs may be received during operation of the IoT devices.

In some implementations, the IoT device 110 may be configured to send the event log to the IoT management system 130 periodically (e.g., according to a schedule and/or based on a detected operation (or a quantity of operations)). Additionally, or alternatively, the IoT device 110 may be configured to send the event log to the IoT management system 130 based on a request received from the IoT management system 130 (which may be transmitted periodically and/or on-demand, such as based on user input). The event log associated with the IoT device 110 may include occurrence data for one or more operations detected by the IoT device 110. In some implementations, the event data may be streamed, during performance of the IoT device 110, to the IoT management system 130. For example, the event data may be generated as the operations occur (e.g., in real-time or near real-time).

In some implementations, the event log may indicate IoT device information that identifies one or more features and/or characteristics of the IoT device 110. The features may include a version of software installed on the IoT device 110, a type of the IoT device 110, a make or model of the IoT device 110, a serial number of the IoT device 110, a name associated with the IoT device 110, and/or an Internet protocol (IP) address associated with the IoT device 110, among other examples. The characteristics may include a usage history of the IoT device 110 (e.g., a quantity of operations performed by the IoT device 110, an identifier of a user signed-in to the IoT device 110, and/or a quantity of certain types of operations performed by the IoT device 110, among other examples).

In some implementations, the IoT management system 130 may further receive status information from the IoT device 110 (e.g., based on the IoT devices being configured to log event data and/or track operations and/or based on the IoT device 110 experiencing an error within a threshold time period after performing the operations). Additionally, or alternatively, the status information may be indicated by a user via a user interface of the IoT device 110 or via the management device 120 (e.g., in association with a supervised learning technique described herein). The status information may identify one or more types of issues (or errors) experienced by the IoT devices during time periods. For example, for printers, such issues may include user-interface problems, faulty printing, delays in performing an operation, printing media failures (e.g., obstructions or wrinkling of media, such as ribbons or labels), or printhead or other hardware component failures, among other examples. In another example, for thermostats, such issues may include inability to activate an associated heating, ventilation, and air conditioning (HVAC) system, display problems (e.g., malfunctioning pixels), or input problems (e.g., a malfunctioning button and/or a malfunctioning touchscreen), among other examples.

As further shown in FIG. 2, in step 220, the process 200 parses the event log to identify activity data, from the event data, associated with at least one operation that includes one or more events of the plurality of events. For example, the IoT management system 130 may identify events associated with individual types of operations based on the event data included in the event logs. For example, the IoT management system 130 may identify that a particular event associated with an operation is a start event (e.g., an event that starts the operation or that is paired with an end event or an intermediate event), an intermediate event of the operation (e.g., an event that occurs between two other events), or an end event of the operation (e.g., an event that ends the operation or that is paired with a start event or an intermediate event). Additionally, or alternatively, the IoT management system 130 may classify a particular event. The IoT management system 130 may classify a particular event as a set event when it is an event that occurs in association with another event to form an operation. The IoT management system may classify a particular event as a standalone event (e.g., an event that is the only event for the operation), or a nested event (nested within an operation formed by paired events or occurring independently). The IoT management system 130 may classify a particular event as a clear event when it is an event that ends an activity or a clear all event that ends all ongoing activities associated with the IoT device 110 (e.g., a shutdown event or power failure event). Additionally, in some implementations, the IoT management system 130 may identify whether the events are passive events or active events. The IoT management system 130 may classify an event as a passive event when the event is a non-task-related event, such as sensor-based events involving a sensor sensing a particular condition, or user-based events involving a user interacting with the IoT device 110 or causing the IoT device 110 to perform an operation. The IoT management system 130 may classify an event as an active event when the event is a task-related event.

In some implementations, the IoT management system 130 may identify activity data by extracting event data from the event log based on rules (e.g., by parsing through the event data to identify paired events and standalone events, as described in connection with FIGS. 3A-3B). For example, the IoT management system 130 may ensure that each identified set event is paired with a clear event. Additionally, the IoT management system 130 may ensure that some types of standalone events are nested within paired events and other types of standalone events are not nested within paired events. In some implementations, the IoT management system 130 may reorder event data. For example, the IoT management system 130 may reorder a standalone event and a clear event based on whether the standalone event is a nested event. For example, an event log may indicate that a print completion event is associated with a same timestamp as a network disconnect event. Accordingly, the IoT management system 130 may reorder the events such that the network disconnect event is not nested within a print start event and the print completion event. In another example, an event log may indicate that a print start event, a printhead close event, and a print completion event all occurred at approximately a same time (or within an amount of time that satisfies a threshold). Accordingly, the IoT management system 130 may reorder the events such that the printhead close event is before the start print event, which is before the print completion event. In another example, an event log may indicate that a coolant level event occurred at approximately a same time (or within an amount of time that satisfies a threshold) as a cooling cycle end event. Accordingly, the IoT management system 130 may reorder the events such that the coolant level event is nested within a cooling cycle start event and the cooling cycle end event.

Additionally, or alternatively, the IoT management system may use an identification model comprising a feature extraction model that is configured to process the event logs and/or the event data to identify features (e.g., based on parameters in the event data, timestamps associated with the events in the event data, or event information received from the management device 120) that are associated with and/or common to a particular type of operation. The feature extraction model may include a machine learning model (e.g., a support vector machine, a regression model, a neural network, a clustering model, a prediction model, and/or a generator model), as described in connection with FIG. 6. For example, the IoT management system 130 may use a classification model (e.g., a clustering model) to identify the activity data.

In some implementations, the event data may include one or more parameters associated with the events. For example, the parameters may indicate power levels, network connectivity statuses, operation statuses (e.g., print success, print fail, scan success, scan fail, heating cycle success, heating cycle fail, cooling cycle success, or cooling cycle fail, among other examples), memory statuses, storage levels, and/or other parameters associated with the events. The IoT management system 130 may copy event data from the event logs into data structures storing the activity data associated with the identified activity.

As further shown in FIG. 2, in step 230, the process 200 generates case data associated with the at least one operation and including the identified activity data. Accordingly, the IoT management system 130 may store a data structure including case data and including the identified activity data. Additionally, the case data may include derived data. For example, the IoT management system 130 may calculate durations associated with the at least one operation based on timestamps included in the activity data.

As further shown in FIG. 2, in step 240, the process 200 performs a process mining operation on the case including the activity data. For example, the IoT management system 130 may process the case data using process mining software (e.g., Celonis Process Mining, UiPath Platform, ARIS Process Mining 10, DISCO, Scout Platform, Minit, SAP Signavio Process Intelligence, Kofax Insight, QPR ProcessAnalyzer, or similar process mining software). It should be understood that process 200 can perform other operations (e.g., predictive analytics, anomaly detection, Monte Carlo analysis, among other examples) on the case data including the activity data.

Although FIG. 2 shows example steps of process 200, in some implementations, process 200 may include additional steps, fewer steps, different steps, or differently arranged steps than those depicted in FIG. 2. Additionally, or alternatively, two or more of the steps of process 200 may be performed in parallel.

Figure 3A:
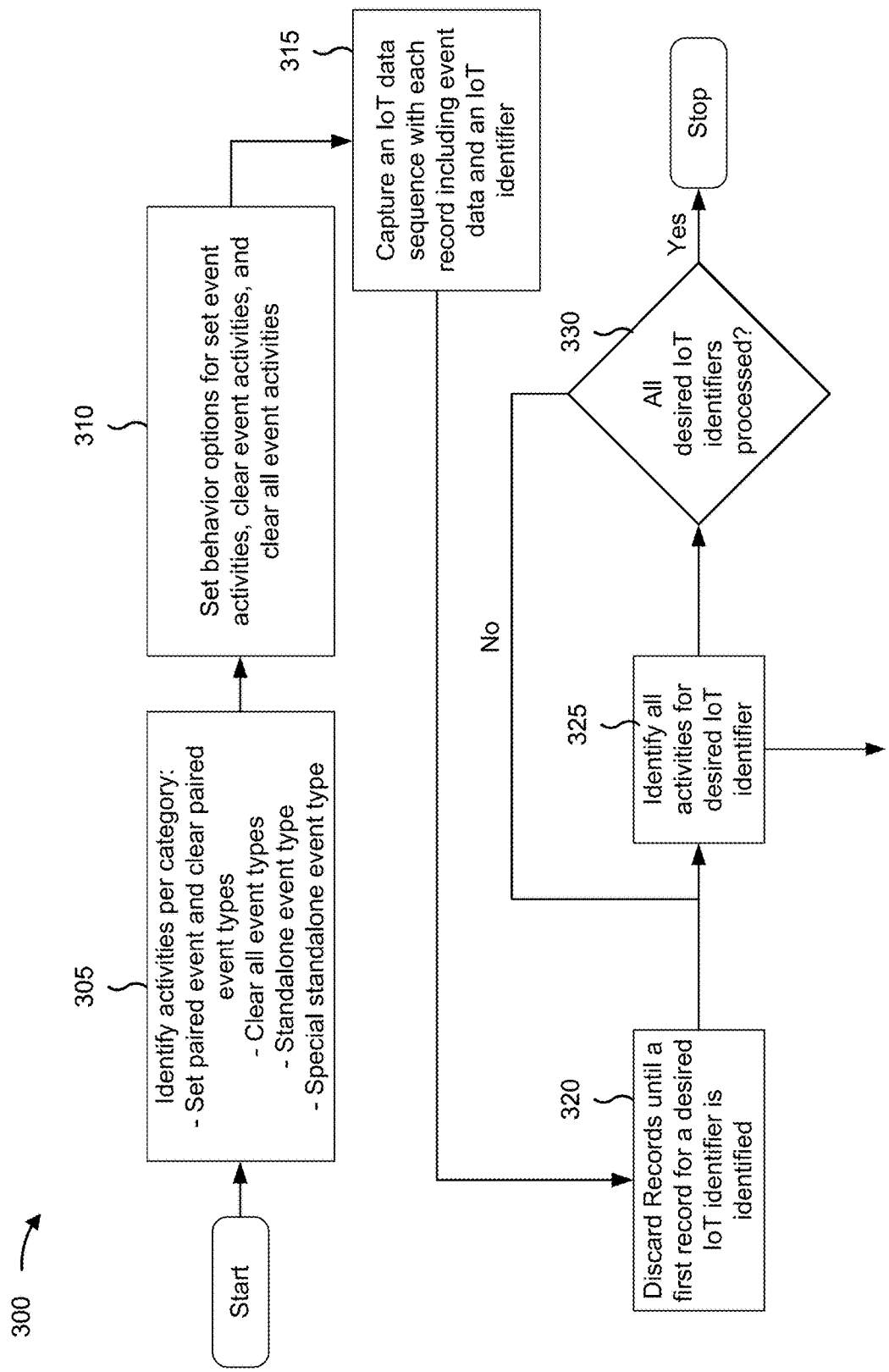
FIGS. 3A-3B are a flowchart illustrating step 220 of FIG. 2 in greater detail.
Figure 3B:
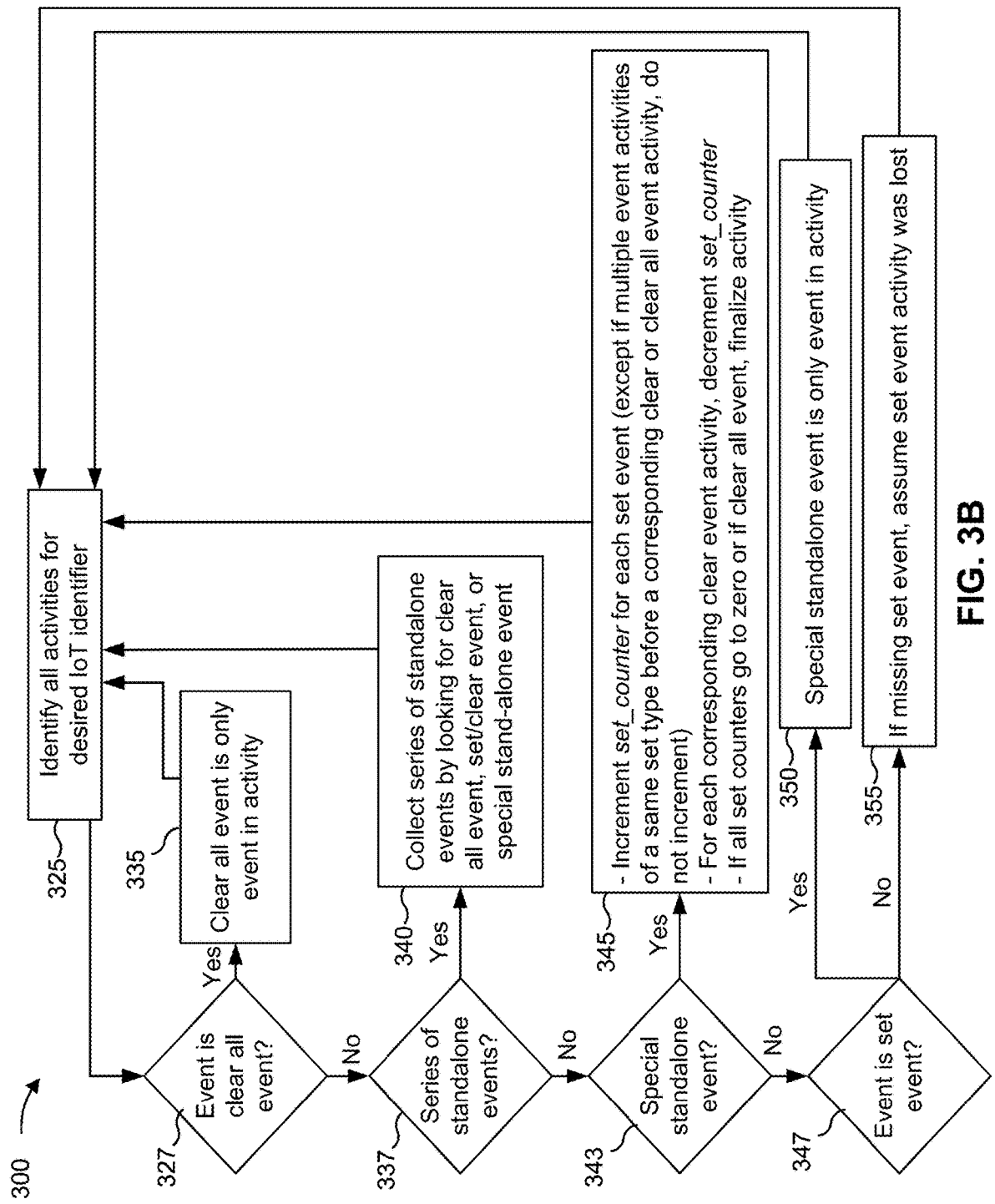

FIGS. 3A-3B are a flowchart of an example process 300 associated with identifying activity data. In some implementations, one or more process steps of FIGS. 3A-3B may be performed by a system (e.g., the IoT management system 130). In some implementations, one or more process steps of FIGS. 3A-3B may be performed by another device or a group of devices separate from or including the system, such as the IoT device 110, the management device 120, and/or a user device 430. Additionally, or alternatively, one or more process steps of FIGS. 3A-3B may be performed by one or more components of device 900 of FIG. 9, such as processor 920, memory 930, input component 940, output component 950, and/or communication component 960.

As shown in FIG. 3A, in step 305, the process 300 identifies activities per category. For example, a set paired event and a clear paired event may be activity types that are logically paired. Accordingly, a set paired event precedes a corresponding clear paired event. Paired events may be nested. For example, nesting occurs when a sequence of events, starting with a set paired event, contains other set paired events occurring prior to a clear paired event for the starting set paired event. Examples of set paired events and clear paired events for printers may include a 'printer head open set' and 'printer head open clear', a 'media out set' and 'media out clear', or a 'ribbon out set' and 'ribbon out clear'. Examples of set paired events and clear paired events for scanners may include a 'start entry event' and a 'scan stop exit event', an 'application start event' and an 'application stop event', a 'battery swap entry event' and a 'battery swap exit event', a 'battery charge on event' and a 'battery charge off event', a' device suspend event' and a 'device suspend recover event', or a 'Bluetooth connect event' and a 'Bluetooth disconnect event'.

Further, a clear all event clears all uncleared paired events. An example clear all event for printers is cold_start_set, which occurs when the printer reboots. For example, the reboot may be user-generated or system-generated.

A standalone event can be included within a set paired event and a clear paired event or within a set paired event and a clear all event. Calibration events are examples of standalone events for printers. Special standalone events are similar to standalone events except that they are independent of paired events. Cut_error-set event is an example of a special standalone event for printers (e.g., a label printer having a media cutting apparatus). Another example is a 'battery low' event. Similarly, timed events may indicate device metrics, such as device firmware version, battery statistics, network connection statistics, or memory statistics.

As further shown in FIG. 3A, in step 310 process 300 sets behavioral options for set event activities, clear event activities, and clear all event activities. For example, a behavioral option for multiple set event activities may include a nesting procedure. In another example, a behavioral option for a clear event without a matching set event may include estimating a preceding set event. In another example, a behavioral option for a clear all event within a sequence of standalone events may include discarding the clear all event.

As further shown in FIG. 3A, in step 315, the process 300 captures an IoT data sequence with a plurality of records, each record including event data and an IoT identifier. Additionally, as shown in FIG. 3A, in step 320, the process 300 discards records until a first record associated with a desired IoT identifier is identified. In step 325, for each desired IoT identifier, activities are identified iteratively as described below in connection with FIG. 3B. Additionally, in step 330, the process 300 determines whether all desired IoT identifiers are processed. If all desired IoT identifies are processed, then process 300 ends. Alternatively, if all desired IoT identifiers are not processed, then process 300 returns to step 325 and may repeat for each desired IoT identifier until all data is processed.

As shown in FIG. 3B, in step 327, process 300 determines whether an event is a clear all event. If an event in the record is a clear all event, process 300 proceeds to step 335 and logs the clear all event as the only event in the activity. Accordingly, process 300 returns to step 325. Alternatively, if an event in the record is not a clear all event, process 300 proceeds to step 337. In step 337, process 300 determines when a series of standalone events begins. If a series of standalone events begins, process 300 proceeds to step 340 and logs the standalone events until finding a clear all event, a set or clear event, or a special standalone event. Accordingly, the clear all event, set/clear event, or special standalone event will be a first event in a subsequent iteration. In some implementations, a behavioral option may include bundling a clear all event and/or a special standalone event in the activity including the series of standalone events. Accordingly, process 300 returns to step 325. Alternatively, if a series of standalone events does not begin, process 300 proceeds to step 343.

In step 343, process 300 determines whether an event in the record is a special standalone event. If an event in the record is a special standalone event, process 300 proceeds to step 345 and logs the special standalone event as the only event in the activity. Accordingly, process 300 returns to step 325. Alternatively, if an event in the record is not a special standalone event, process 300 proceeds to step 347. In step 347, process 300 determines whether an event in the record is a set event. If an event in the record is a set event, process 300 proceeds to step 350 and increments a counter associated with set events. However, if multiple events of a same set event activity type occur before a corresponding clear (or clear all) event, the counter is not incremented. Additionally, in step 350, when an event in the record is a clear event, process 300 decrements the counter.

When the counter goes to zero or a clear all event is detected, process 300 logs the activity. Accordingly, standalone events (or special standalone events) before the counter goes to zero or the clear all event is detected are included in the activity. Additionally, process 300 returns to step 325.

Alternatively, if an event in the record is not a set event, process 300 proceeds to step 355. In step 355, if a set event is missing for a corresponding clear event, process 300 assumes the set event was lost. Accordingly, the corresponding set event will be added to the activity including the clear event. Additionally, process 300 returns to step 325.

Although FIGS. 3A-3B show example steps of process 300, in some implementations, process 300 may include additional steps, fewer steps, different steps, or differently arranged steps than those depicted in FIGS. 3A-3B. Additionally, or alternatively, two or more of the steps of process 300 may be performed in parallel.

FIG. 4 is a diagram of an example implementation 400 associated with a system for monitoring an IoT device operation, as described herein. As shown in FIG. 4, example implementation 400 includes an IoT device 110 with an IoT device controller 410 and an event log 420, a user device 430, and an IoT management system 130 (e.g., the IoT management system 130 of example implementation 100).

These devices are described in more detail below in connection with FIG. 8 and FIG. 9.

The IoT device 110 may perform an operation. For example, the operation may include a printing operation, a maintenance operation, a user-based operation, a software-based operation, a cooling system operation, a heating system operation, a filter operation, an image capture operation, or a focus operation, among other examples. The IoT device 110, as shown, may include the IoT device controller 410 and the event log 420. The IoT device controller 410 may be configured to generate and/or maintain the event log 420 associated with operations that are performed and/or detected. For example, the IoT device controller 410 may store event data (e.g., in real-time or as the operation occurs). As described herein, the event data may further include or identify event parameters and/or timestamps associated with the events.

Accordingly, the IoT management system 130 may determine a prediction for the IoT device 110 based on at least one operation identified based on the event data included in the event notification(s). For example, based on the at least one operation and process mining performed (e.g., by the process mining software 160) on case data (e.g., in a case data structure 170) including activity data, the IoT management system 130 may predict a subsequent state or operation for the IoT device 110. For example, the prediction may include a probability that the state or operation will occur within a time period.

Accordingly, the IoT management system 130 may determine a configuration for the IoT device 110 and transmit the configuration to the user device 430 and/or the IoT device 110. Accordingly, based on the received configuration, the user device 430 and/or the IoT device 110 may adjust one or more settings of the IoT device identified in the configuration to optimize the IoT device, as described herein. In some implementations, the configuration may be associated with the prediction for the IoT device 110.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

Figure 5:
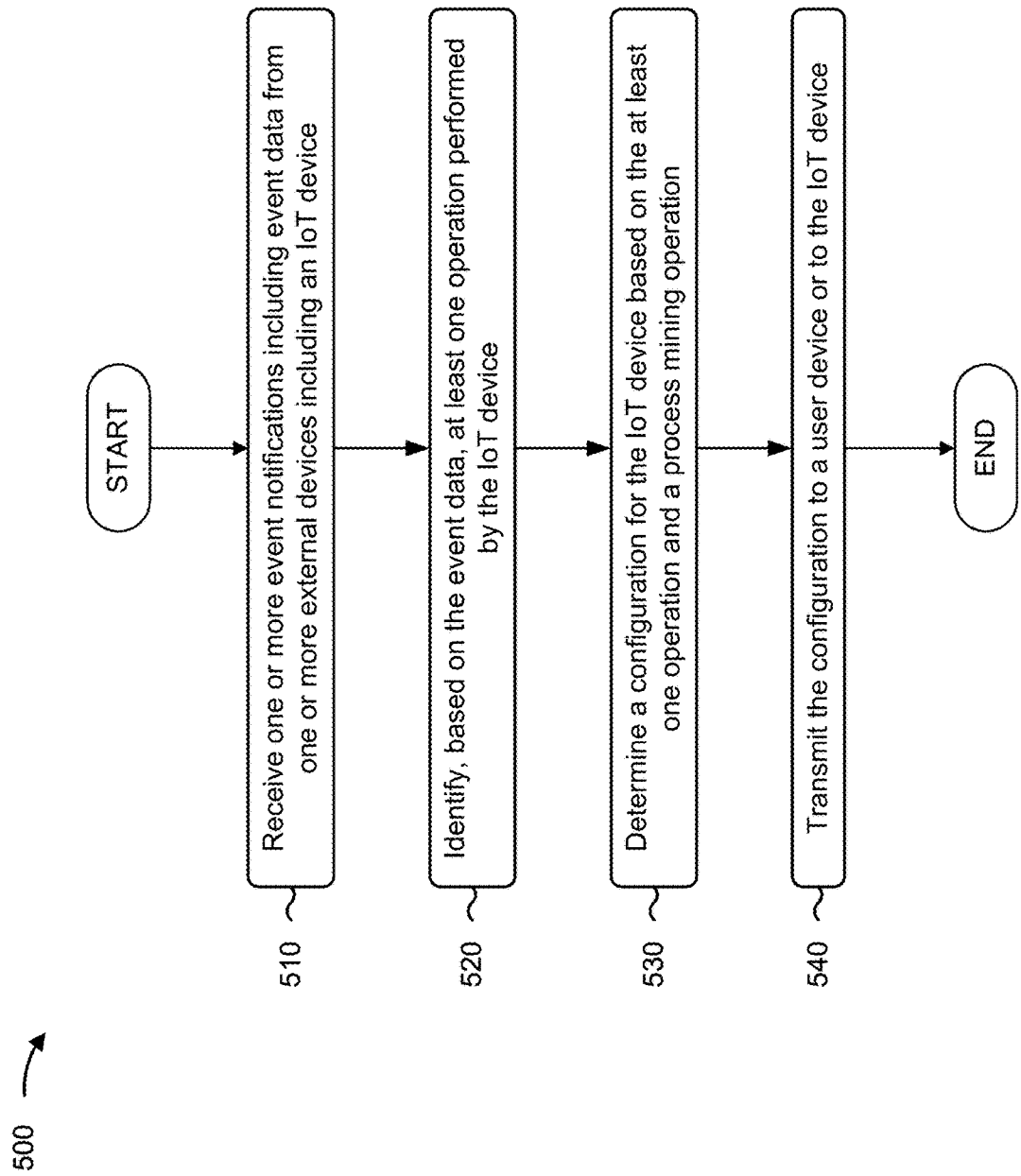
FIG. 5 is a flowchart of an example process relating to FIG. 4.

FIG. 5 is a flowchart of an example process 500 associated with configuring an IoT device. In some implementations, one or more process steps of FIG. 5 may be performed by a system (e.g., the IoT management system 130). In some implementations, one or more process steps of FIG. 5 may be performed by another device or a group of devices separate from or including the system, such as the IoT device 110, the management device 120, and/or a user device 430. Additionally, or alternatively, one or more process steps of FIG. 5 may be performed by one or more components of device 900 of FIG. 9, such as processor 920, memory 930, input component 940, output component 950, and/or communication component 960.

As shown in FIG. 5, in step 510, process 500 receives one or more event notifications including event data from one or more external devices (e.g., including the IoT device 110). Accordingly, the IoT management system 130 may receive event notification(s) that indicate that an operation occurred resulting in event data being logged. In some implementations, the event notification(s) may be received based on a particular operation occurring, based on the IoT device 110 detecting that the operation occurred, and/or periodically. For instance, a media out event notification may be transmitted by a printer when a media sensor of the printer does not detect media. Similarly, a printhead error event notification may be transmitted by a printer when a controller of the printer detects a long time period without printing, measures a resistance value of a printhead of the printer, and transmits the measured value to the IoT management system 130.

As further shown in FIG. 5, in step 520, process 500 identifies, based on the event data, at least one operation. Accordingly, the IoT management system 130 may identify the at least one operation performed by the IoT device 110. For example, the IoT management system may use rules and/or a machine learning model, as described herein, to determine the operation being performed. The IoT management system 130 may establish an activity set associated with the operation being performed and select event data, from the event notification(s), to be included in the activity set.

As further shown in FIG. 5, in step 530, process 500 determines a configuration for the IoT device based on the at least one operation and a process mining operation. For example, the IoT management system 130 may predict a subsequent state or operation for the IoT device 110 and determine the configuration (e.g., settings for the IoT device 110) to improve the ability of the IoT device 110 to perform (e.g., with less power, processing resources, or memory). In one example, the IoT device 110 may be a printer, and the IoT management system 130 may adjust a configuration associated with a print job, such as reducing print darkness to conserve battery power, based on predicting an approaching battery discharged event. In another example, the IoT device 110 may be a barcode scanner, the event notification may indicate a removal from dock event, and the IoT management system 130 may instruct the scanner to initiate a network connection to reduce latency between scanning object barcodes and providing decoded data to the IoT management system 130, based on the IoT management system 130 predicting an approaching scan complete event. In another example, the IoT device 110 may be a thermostat, and the IoT management system 130 may trigger the thermostat to turn off a display of the thermostat to conserve power and processing resources, based on predicting an approaching cooling cycle complete event or heating cycle complete event. As a result, the IoT management system 130 (e.g., in real-time) may improve a capability of the IoT device 110, thereby conserving power, computing resources, and/or device resources (e.g., media or other materials) that would otherwise be wasted if the configuration were not updated.

As further shown in FIG. 5, in step 540, process 500 transmits the configuration to a user device or to the IoT device. Accordingly, based on the received configuration, the user device 430 and/or the IoT device 110 may adjust one or more settings of the IoT device 110 identified in the configuration to optimize the IoT device 110, as described above.

Although FIG. 5 shows example steps of process 500, in some implementations, process 500 may include additional steps, fewer steps, different steps, or differently arranged steps than those depicted in FIG. 5. Additionally, or alternatively, two or more of the steps of process 500 may be performed in parallel.

Figure 6:
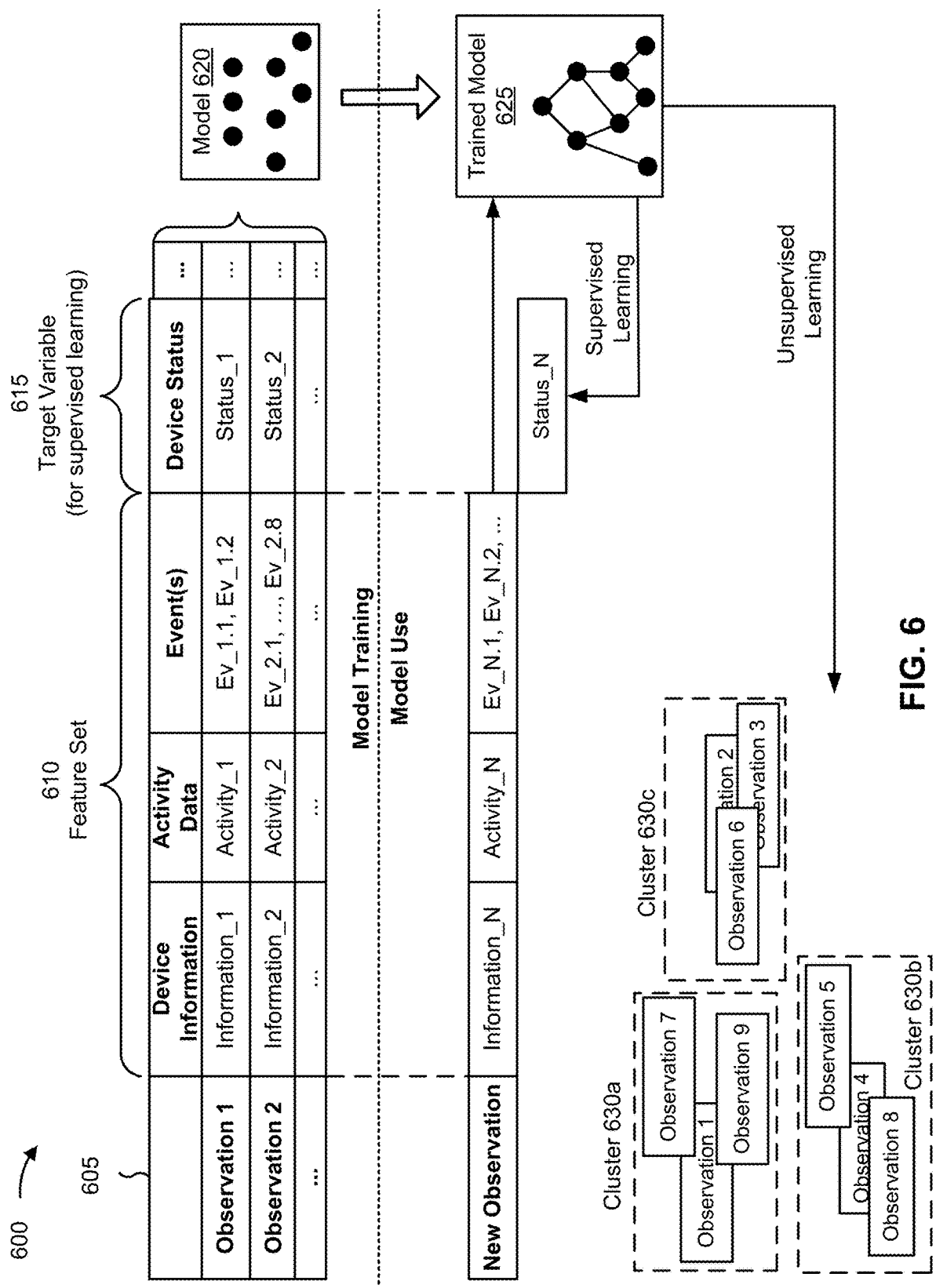
FIG. 6 is a diagram of another example implementation of training and/or using a model described herein.

FIG. 6 is a diagram illustrating an example 600 of training and using a machine learning model in connection with learning and identifying activities associated with an IoT device 110. The machine learning model training and usage described herein may be performed using a machine learning system. The machine learning system may include or may be included in a computing device, a server, a cloud computing environment, or the like, such as the IoT management system 130, as described in more detail elsewhere herein.

As shown by reference number 605, a machine learning model may be trained using a set of observations. The set of observations may be obtained from training data (e.g., historical data), such as data gathered during one or more processes described herein. In some implementations, the machine learning system may receive the set of observations (e.g., as an input) from one or more IoT devices 110a through 110n, a user device 430, and/or a management device 120, as described elsewhere herein.

As shown by reference number 610, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the IoT device(s) 110a through 110n, the user device 430, and/or the management device 120. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of IoT device information (e.g., identifying information, such as a name, an IP address, a serial number, and/or another similar type of information), a second feature based on activity data (e.g., an occurrence type with an activity set), a third feature of event data (e.g., associated with operations performed by an IoT device), and so on. As shown, for a first observation, the first feature may have a value of Information_1 (e.g., identifying a first IoT device), the second feature may have a value of Activity_1 (e.g., identifying an occurrence type), the third feature may have a value of Ev_1.1, Ev_1.2, and so on (e.g., identifying event data associated with Activity_1), among other examples. These features and feature values are provided as examples, and may differ in other examples. For example, the feature set may include one or more of the following features: a location of the IoT device, an entity or user associated with the IoT device, a type of media associated with the activity, a power (or other resource) consumption associated with the activity, timestamps associated with the events, and/or usage history of the IoT device, among other examples.

As shown by reference number 615, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, or labels) and/or may represent a variable having a Boolean value. A target variable may be associated with a target variable value, and a target variable value may be specific to an observation. In example 300, the target variable is an IoT device status (e.g., indicative of a next expected event for the IoT device), which has a value of Status_1 for the first observation.

The feature set and target variable described above are provided as examples, and other examples may differ from what is described above. For example, for a target variable of activity type, the feature set may include events and timestamps associated with the events.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

The machine learning system may train a machine learning model 620 using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 625 to be used to analyze new observations.

Furthermore, the machine learning system may apply the trained machine learning model 625 to a new observation, such as by receiving a new observation and inputting the new observation to the trained machine learning model 625. As shown, the new observation may include a first feature of IoT device information, a second feature of activity data, a third feature of event data, and so on, as an example. The machine learning system may apply the trained machine learning model 625 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 625 may predict a value of Status_N for the target variable of IoT device status for the new observation. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, an indication to change a setting of a configuration of the IoT device and/or an indication to update software or firmware of the IoT device. The first automated action may include, for example, automatically adjusting a setting of the configuration of the IoT device and/or automatically downloading or installing an update to the software or the firmware of the IoT device.

In some implementations, the trained machine learning model 625 may classify (e.g., cluster) the new observation in a cluster. The observations within a cluster may have a threshold degree of similarity. As an example, if the machine learning system classifies the new observation in a first cluster 630*a* (e.g., a cluster associated with a status or a group of statuses), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above. Other clusters may include cluster 630*b* and cluster 630*c*, as shown in FIG. 6.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. The recommendations, actions, and clusters described above are provided as examples, and other examples may differ from what is described above.

In some implementations, the trained machine learning model 625 may be re-trained using feedback information. For example, feedback may be provided to the machine learning model. The feedback may be associated with actions performed based on the recommendations provided by the trained machine learning model 625 and/or automated actions performed, or caused, by the trained machine learning model 625. In other words, the recommendations and/or actions output by the trained machine learning model 625 may be used as inputs to re-train the machine learning model (e.g., a feedback loop may be used to train and/or update the machine learning model). For example, the feedback information may include updated event information associated with the IoT device.

In this way, the machine learning system may apply a rigorous and automated process to learn and identify statuses associated with IoT devices. The machine learning system enables recognition and/or identification of tens, hundreds, thousands, or millions of features and/or feature values for tens, hundreds, thousands, or millions of observations, thereby increasing accuracy and consistency and reducing delay associated with identifying statuses and improvements for IoT devices. Additionally, or alternatively, the machine learning system may apply a rigorous and automated process to learn and identify activities in event logs associated with IoT devices. The machine learning system enables recognition and/or identification of tens, hundreds, thousands, or millions of features and/or feature values for tens, hundreds, thousands, or millions of observations, thereby increasing accuracy and consistency and reducing delay associated with identifying activities for IoT devices, which may be used to apply process mining operations to cases associated with the activities and thereby improve operation of the IoT device.

As indicated above, FIG. 6 is provided as an example. Other examples may differ from what is described in connection with FIG. 6.

Figure 7:
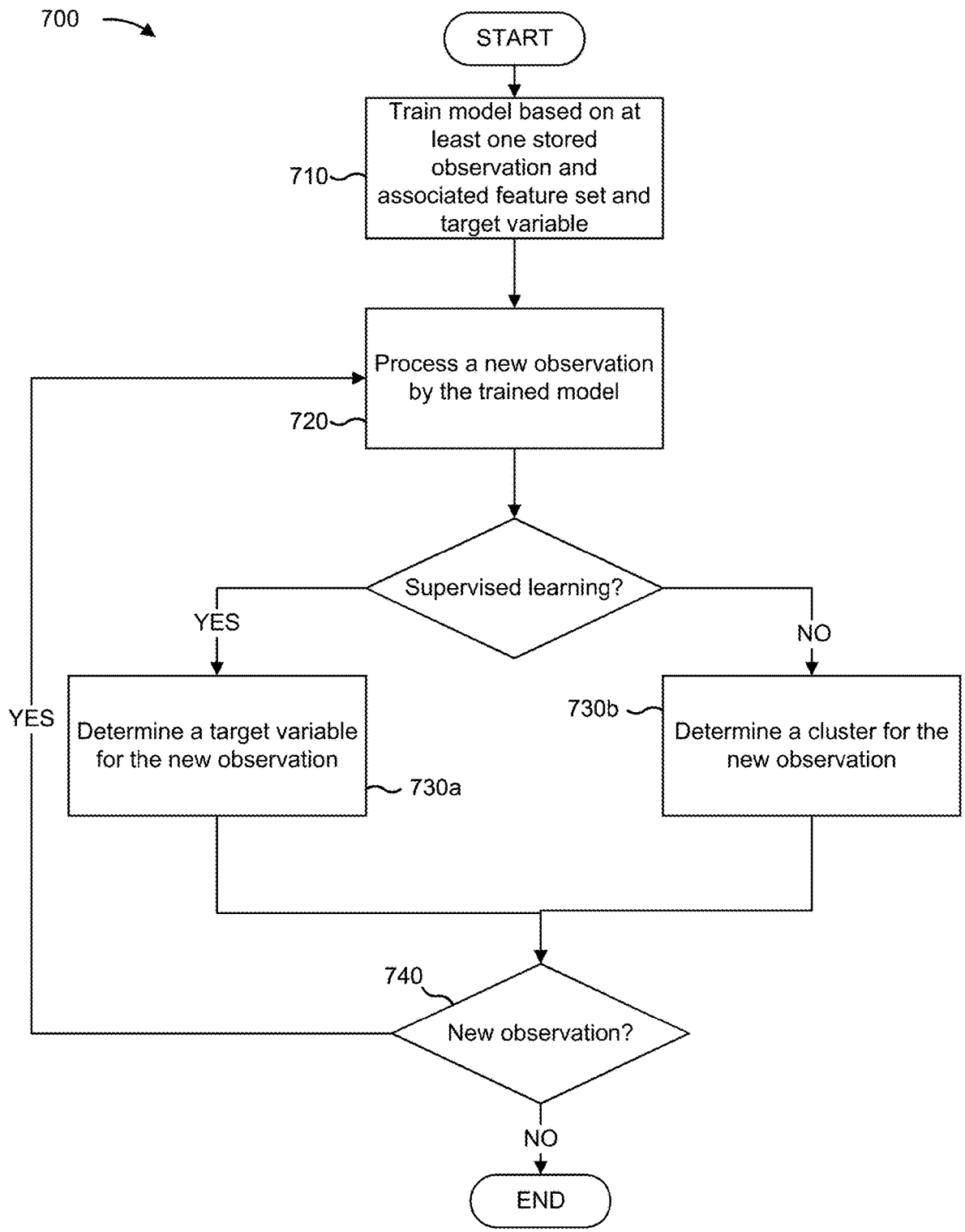
FIG. 7 is a flowchart of an example process relating to FIG. 6.

FIG. 7 is a flowchart of an example process 700 associated with training and using a machine learning model. In some implementations, one or more process steps of FIG. 7 may be performed by a system (e.g., the IoT management system 130). In some implementations, one or more process steps of FIG. 7 may be performed by another device or a group of devices separate from or including the system, such as the IoT device 110, the management device 120, and/or a user device 430. Additionally, or alternatively, one or more process steps of FIG. 7 may be performed by one or more components of device 900 of FIG. 9, such as processor 920, memory 930, input component 940, output component 950, and/or communication component 960.

As shown in FIG. 7, in step 710, process 700 trains a machine learning model based on at least one stored observation and associated feature set and target variable. Accordingly, the IoT management system 130 may train the machine learning model using one or more machine learning algorithms, such as a regression algorithm, a decision tree algorithm, a neural network algorithm, a k-nearest neighbor algorithm, a support vector machine algorithm, or the like. After training, the IoT management system 130 may store the machine learning model as a trained machine learning model to be used to analyze new observations.

As an example, the IoT management system 130 may obtain training data indicating the at least one stored observation based on historical (and/or real world) uses of IoT devices 110*a* through 110*n* during a certain time period (such as a training period, evaluation period, and/or testing period). In such a case, the IoT management system 130 may receive reference event data and/or reference event logs associated with the IoT devices 110*a* through 110*n* performing operations during uses of the IoT devices 110*a* through 110*n*. Additionally, or alternatively, a pre-selected or pre-configured set of IoT devices (e.g., with various sets of characteristics or configurations) may be configured for use that is dedicated to training the model of the IoT management system 130, as described herein.

As further shown in FIG. 7, in step 720, process 700 processes a new observation by the trained model. For example, in step 730*a* for supervised learning, the trained model may predict a target variable for the new observation. Alternatively, in step 730*b* for unsupervised learning, the trained model may determine a cluster for the new observation.

As further shown in FIG. 7, in step 740, process 700 determines whether a new observation is available. If a new observation is available, process 700 returns to step 720. As such, process 700 can iterate for each new observation to be processed. Accordingly, the trained model may be used repeatedly for new observations. Alternatively, if a new observation is not available, process 700 ends. In some implementations, as described in connection with FIG. 6, the model may be re-trained using output from some or all of the new observations.

Although FIG. 7 shows example steps of process 700, in some implementations, process 700 may include additional steps, fewer steps, different steps, or differently arranged steps than those depicted in FIG. 7. Additionally, or alternatively, two or more of the steps of process 700 may be performed in parallel.

Figure 8:
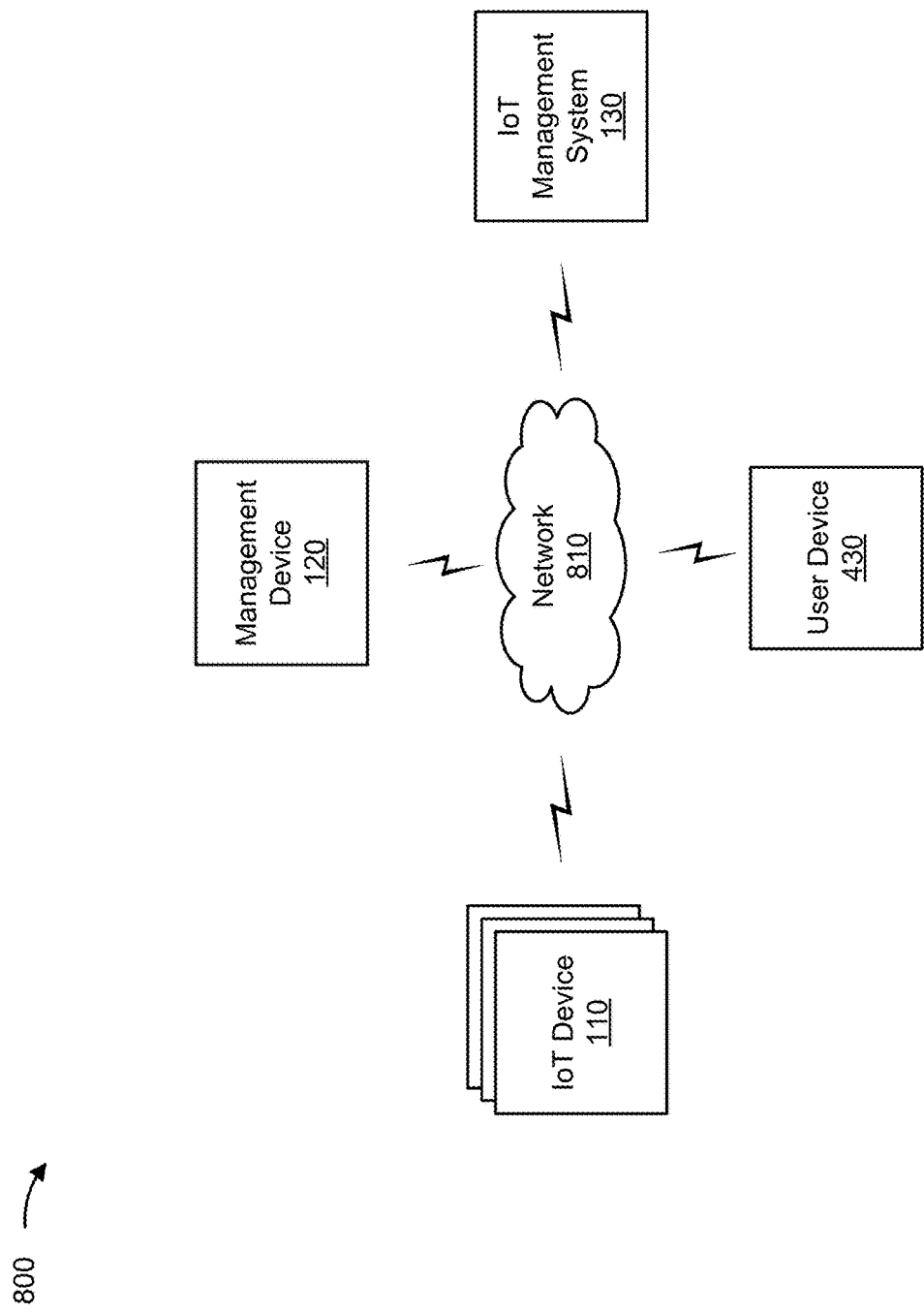
FIG. 8 is a diagram of an example environment in which systems and/or methods described herein may be implemented.

FIG. 8 is a diagram of an example environment 800 in which systems and/or methods described herein may be implemented. As shown in FIG. 8, environment 800 may include an IoT management system 130, one or more IoT devices 110, a management device 120, a user device 430, and a network 810. Devices of environment 800 may interconnect via wired connections, wireless connections, or a combination of wired and wireless connections.

The IoT management system 130 includes one or more devices capable of receiving, generating, storing, processing, providing, and/or routing information associated with learning, identifying, and/or monitoring an operation of an IoT device 110, as described elsewhere herein. The IoT management system 130 may include a communication device and/or a computing device. For example, the IoT management system 130 may include a server, such as an application server, a client server, a web server, a database server, a host server, a proxy server, a virtual server (e.g., executing on computing hardware), or a server in a cloud computing system. In some implementations, the IoT management system 130 includes computing hardware used in a cloud computing environment.

The IoT device 110 includes one or more devices capable of receiving, generating, storing, processing, and/or providing information associated with performance of one or more operations and/or event logs associated with the operations, as described elsewhere herein. In an embodiment, the IoT device 110 may include one or more of a printer, scanner, thermostat, mobile computer, or the like. The IoT device 110 may include a communication device and/or a computing device that enables communication with one or more of the other devices of environment 800.

The management device 120 includes one or more devices capable of receiving, generating, storing, processing, and/or providing information associated with managing performance of an operation of the IoT device 110 and/or managing or controlling the IoT management system 130, as described elsewhere herein. The management device 120 may include a communication device and/or a computing device. For example, the management device 120 may include a wireless communication device, a mobile phone, a user equipment, a laptop computer, a tablet computer, a desktop computer, an unmanned aerial vehicle (UAV), a wearable communication device (e.g., a smart wristwatch, a pair of smart eyeglasses, a head mounted display, or a virtual reality headset), or a similar type of device.

The user device 430 includes one or more devices capable of receiving, generating, storing, processing, and/or providing information associated with managing, controlling, or using the IoT device 110, as described elsewhere herein. The user device 430 may include a communication device and/or a computing device. For example, the user device 430 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
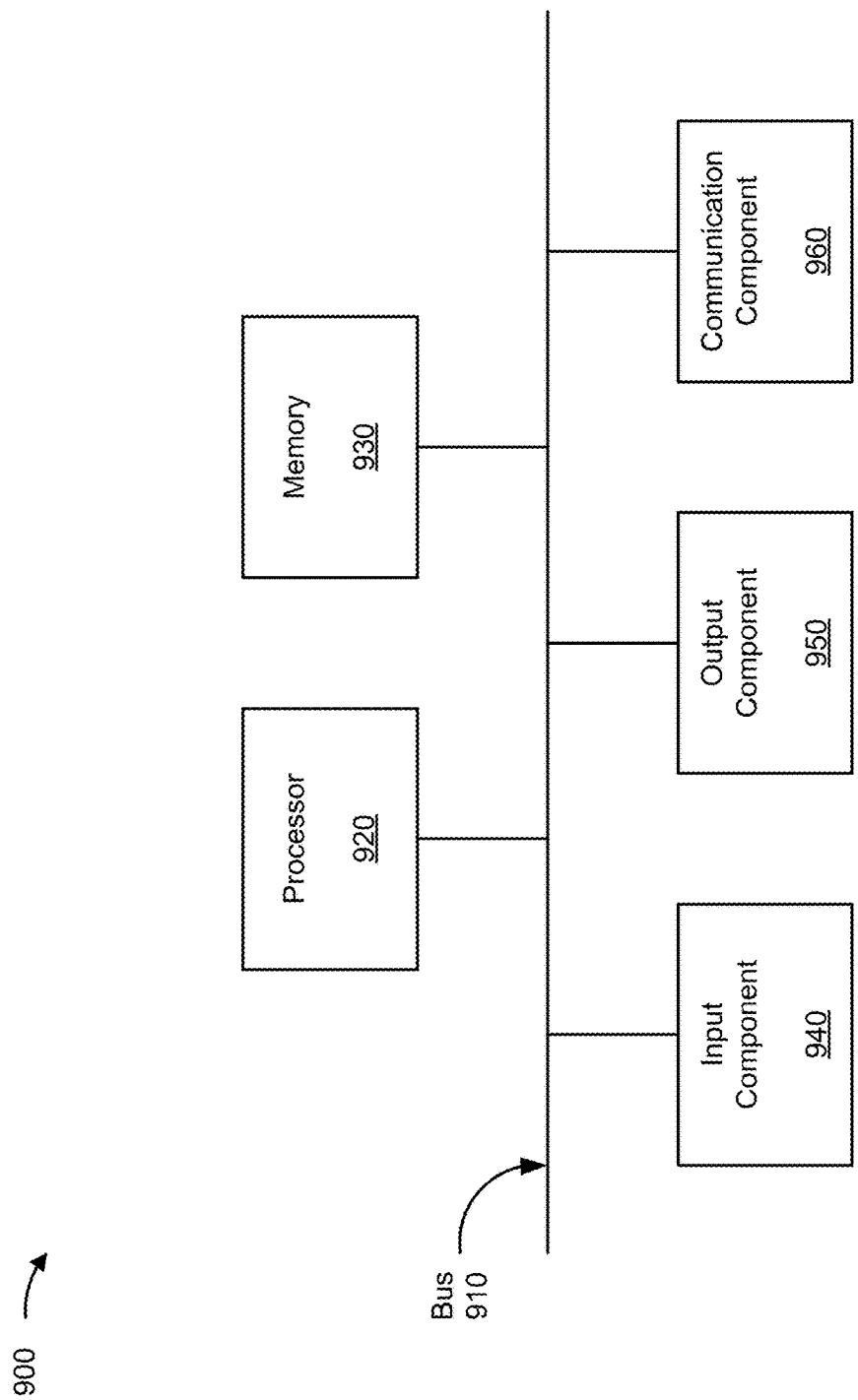
FIG. 9 is a diagram of example components of one or more devices of FIG. 8.

FIG. 9 is a diagram of example components of a device 900, which may correspond to the IoT management system 130, the IoT device 110, the management device 120, and/or the user device 430. In some implementations, the IoT management system 130, the IoT device 110, the management device 120, and/or the user device 430 include one or more devices 900 and/or one or more components of device 900. As shown in FIG. 9, device 900 may include a bus 910, a processor 920, a memory 930, an input component 940, an output component 950, and a communication component 960.

Bus 910 includes one or more components that enable wired and/or wireless communication among the components of device 900. Bus 910 may couple together two or more components of FIG. 9, such as via operative coupling, communicative coupling, electronic coupling, and/or electric coupling. Processor 920 includes a central processing unit, a graphics processing unit, a microprocessor, a controller, a microcontroller, a digital signal processor, a field-programmable gate array, an application-specific integrated circuit, and/or another type of processing component. Processor 920 is implemented in hardware, firmware, or a combination of hardware and software. In some implementations, processor 920 includes one or more processors capable of being programmed to perform one or more operations or processes described elsewhere herein.

Memory 930 includes volatile and/or nonvolatile memory. For example, memory 930 may include random access memory (RAM), read only memory (ROM), a hard disk drive, and/or another type of memory (e.g., a flash memory, a magnetic memory, and/or an optical memory). Memory 930 may include internal memory (e.g., RAM, ROM, or a hard disk drive) and/or removable memory (e.g., removable via a universal serial bus connection). Memory 930 may be a non-transitory computer-readable medium. Memory 930 stores information, instructions, and/or software (e.g., one or more software applications) related to the operation of device 900. In some implementations, memory 930 includes one or more memories that are coupled to one or more processors (e.g., processor 920), such as via bus 910. Additionally, or alternatively, memory 930 may include one or more memories that are integrated (e.g., on a same chip or package) as the processor 920.

Input component 940 enables device 900 to receive input, such as user input and/or sensed input. For example, input component 940 may include a touch screen, a keyboard, a keypad, a mouse, a button, a microphone, a switch, a sensor, a global positioning system sensor, an accelerometer, a gyroscope, and/or an actuator. Output component 950 enables device 900 to provide output, such as via a display, a speaker, and/or a light-emitting diode. Communication component 960 enables device 900 to communicate with other devices via a wired connection and/or a wireless connection. For example, communication component 960 may include a receiver, a transmitter, a transceiver, a modem, a network interface card, and/or an antenna.

Device 900 may perform one or more operations or processes described herein. For example, a non-transitory computer-readable medium (e.g., memory 930) may store a set of instructions (e.g., one or more instructions or code) for execution by processor 920. Processor 920 may execute the set of instructions to perform one or more operations or processes described herein. In some implementations, execution of the set of instructions, by one or more processors 920, causes the one or more processors 920 and/or the device 900 to perform one or more operations or processes described herein. In some implementations, hardwired circuitry is used instead of or in combination with the instructions to perform one or more operations or processes described herein. Additionally, or alternatively, processor 920 may be configured to perform one or more operations or processes described herein. Thus, implementations described herein are not limited to any specific combination of hardware circuitry and software.

The number and arrangement of components shown in FIG. 9 are provided as an example. Device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method to perform a process mining operation on case data associated with an Internet of Things (IoT) device, comprising:
   receiving, by a device, an event log including event data associated with a plurality of events that were performed by one or more external devices including the IoT device, the event data being detected and stored by the one or more external devices including the IoT device and the event log being a text data structure including the event data;
   training, by the device, a machine learning model based on historical event log data;
   parsing, by the device and utilizing the trained machine learning model, the event log to identify activity data, from the event data, associated with at least one operation that includes one or more events of the plurality of events;
   generating, by the device, case data associated with the at least one operation and including the identified activity data;
   performing, by the device, a process mining operation on the case data; and
   configuring the one or more external devices including the IoT device based on an output of the processing mining operation.

2. The method of claim 1, wherein the activity data comprises a set event paired with a clear event.

3. The method of claim 1, wherein the activity data comprises a standalone event.

4. The method of claim 1, wherein the case data comprises first activity data including a set event paired with a clear event and second activity data nested within the first activity data.

5. The method of claim 1, wherein the case data further includes a duration based on timestamps associated with the one or more events included in the at least one operation.

6. The method of claim 1, further comprising:
identifying, by the device, a portion of the event data associated with the IoT device; and
discarding, by the device, a remaining portion of the event data before parsing the event log.

7. The method of claim 1, wherein parsing the event log comprises:
identifying a standalone event and a clear event that are separated by an amount of time that satisfies an overlap threshold; and
reordering the standalone event and the clear event based on whether the standalone event is a nested event.

8. The method of claim 1, wherein the IoT device comprises a printer or a mobile computer.

9. A tangible machine-readable medium storing a set of instructions, the set of instructions comprising:
one or more instructions that, when executed by one or more processors of a device, cause the device to:
receive an event log including event data associated with a plurality of events that were performed by one or more external devices including an Internet of Things (IoT) device, the event data being detected and stored by the one or more external devices including the IoT device and the event log being a text data structure including the event data;
train a machine learning model based on historical event log data;
parse, utilizing the trained machine learning model, the event log to identify activity data, from the event data, associated with at least one operation that includes one or more events of the plurality of events;
generate case data associated with the at least one operation and including the activity data;
perform a process mining operation on the case data including the activity data;
configure the one or more external devices including the IoT device based on an output of the processing mining operation; and
display, on a user interface, the output of the processing mining operation.

10. The tangible machine-readable medium of claim 9, wherein the at least one activity comprises a set event paired with a clear event.

11. The tangible machine-readable medium of claim 9, wherein the activity data comprises a standalone event.

12. The tangible machine-readable medium of claim 9, wherein the case data comprises first activity data including a set event paired with a clear event and second activity data nested within the first activity data.

13. The tangible machine-readable medium of claim 9, wherein the case data further includes a duration based on timestamps associated with the one or more events included in the at least one operation.

14. The tangible machine-readable medium of claim 9, wherein the one or more instructions, when executed, further cause the device to:
identify a portion of the event data associated with the IoT device; and
discard a remaining portion of the event data before parsing the event log.

15. The tangible machine-readable medium of claim 9, wherein the one or more instructions, that cause the device to parse the event log, cause the device to:
identify a standalone event and a clear event that are separated by an amount of time that satisfies an overlap threshold; and
reorder the standalone event and the clear event based on whether the standalone event is a nested event.

16. The tangible machine-readable medium of claim 9, wherein the one or more external devices includes a printer or a mobile computer.

17. A device, comprising:
one or more memories; and
one or more processors, coupled to the one or more memories, configured to:
receive an event log including event data associated with a plurality of events that were performed by one or more external devices including an Internet of Things (IoT) device, the event data being detected and stored by the one or more external devices including the IoT device and the event log being a text data structure including the event data;
train a machine learning model based on historical event log data;
parse, utilizing the trained machine learning model, the event log to identify activity data, from the event data, associated with at least one operation that includes one or more events of the plurality of events;
generate case data associated with the at least one operation and including information generated based on the activity data;
perform a process mining operation on the case data including the activity data;
configure the one or more external devices including the IoT device based on an output of the processing mining operation; and
display, on a user interface, the output of the processing mining operation.

18. The device of claim 17, wherein the activity data comprises a set event paired with a clear event.

19. The device of claim 17, wherein the activity data comprises a standalone event.

20. The device of claim 17, wherein the case data comprises first activity data including a set event paired with a clear event and second activity data nested within the first activity data.

21. The tangible machine-readable medium of claim 9, wherein the one or more instructions, when executed, further cause the device to:
display, on the user interface, descriptive analytics based on the case data; and
process information based on process task data associated with a user of the IoT device.

* * * * *